United States Patent [19]

Mons

[11] 3,740,651

[45] June 19, 1973

[54] ARRANGEMENTS FOR TUNING A RECEIVER

[75] Inventor: Johannes Jan Mons, Emmasingel, Netherlands

[73] Assignee: U.S. Philips Corporation, New York, N.Y.

[22] Filed: Oct. 5, 1971

[21] Appl. No.: 186,651

[30] Foreign Application Priority Data

Oct. 10, 1970 Netherlands ....................... 7014892

[52] U.S. Cl. ................. 325/464, 325/468, 334/15, 325/455

[51] Int. Cl. ............................................. H04b 1/26

[58] Field of Search .................... 307/223 R, 223 B, 307/221 R; 325/452, 464, 465, 468, 422; 328/43; 334/11, 14, 15

[56] References Cited

UNITED STATES PATENTS

| | | | |
|---|---|---|---|
| 3,503,018 | 3/1970 | Cavanagh | 334/15 |
| 3,381,137 | 4/1968 | Brown | 307/233 R |
| 3,083,306 | 3/1963 | Lindstrom et al. | 307/233 R |
| 3,678,183 | 7/1972 | Montgomery | 334/15 X |

*Primary Examiner*—Benedict V. Safourek
*Attorney*—Frank R. Trifari

[57] ABSTRACT

The invention relates to an arrangement for pre-adjustable transmitter tuning of a receiver tunable by electronically controllable reactances, by means of a tuning voltage optionally derived from a plurality of tuning potentiometers. Each tuning potentiometer is connected to a collector of a four-layer semiconductor device, the base electrode of which is coupled to a signalling device and the anode of which is connected via an RC-network to a common resistor . . . .

4 Claims, 2 Drawing Figures

INVENTOR.
JOHANNES JAN MONS
BY
AGENT

INVENTOR.

JOHANNES JAN MONS

BY

AGENT

ARRANGEMENTS FOR TUNING A RECEIVER

The invention relates to an arrangement for tuning a receiver in which tuning is effected by applying a tuning voltage to one or more electronically controllable reactances, comprising a plurality of operable signalling devices, each signalling device being associated with a bistable trigger circuit controlled by said signalling device and having a rest condition and an operating condition, said trigger circuit changing from the rest condition to the operation condition when the associated signalling device is operated, an electrical locking arrangement coupled to all bistable trigger circuits, which locking arrangement brings all other bistable trigger circuits previously being in the operating condition to the rest condition upon a change-over of one of the bistable trigger circuits from the rest condition to the operating condition, an adjustable potentiometer associated with and coupled to each bistable trigger circuit, which potentiometer is connected across a preferably stabilised voltage supply source only when the associated bistable trigger circuit is in the operating condition, and means which connect all adjustable potentiometers to a common lead for applying the tuning voltage to the electronically controllable reactances.

An object of the present invention is to provide a cheap and reliably functioning arrangement of the kind described above, which may be operated at a low supply voltage with a relatively low current consumption and to this end the arrangement according to the invention is characterized in that each bistable trigger circuit comprises a four-layer semiconductor device including an emitter electrode, a base electrode, a collector electrode and an anode which is blocked in the rest condition of the bistable trigger circuit and is conducting in the operating condition, the emitter electrode of the four-layer semiconductor device being connected to a first terminal of a voltage supply source, the base electrode being controlled by the signalling device, the collector electrode being coupled to the associated adjustable potentiometer and the anode being connected to the second terminal of the voltage supply source through the parallel arrangement of a resistor and a capacitor followed by a resistor which is common to all bistable trigger circuits.

Figure 1:
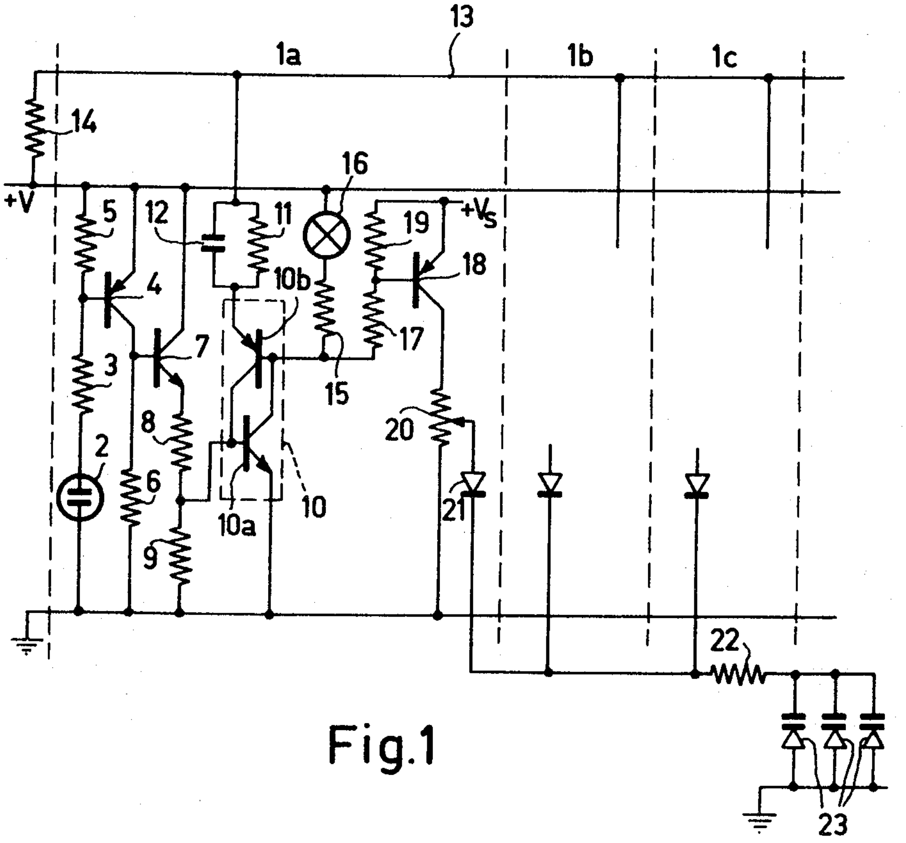
Figure 2:
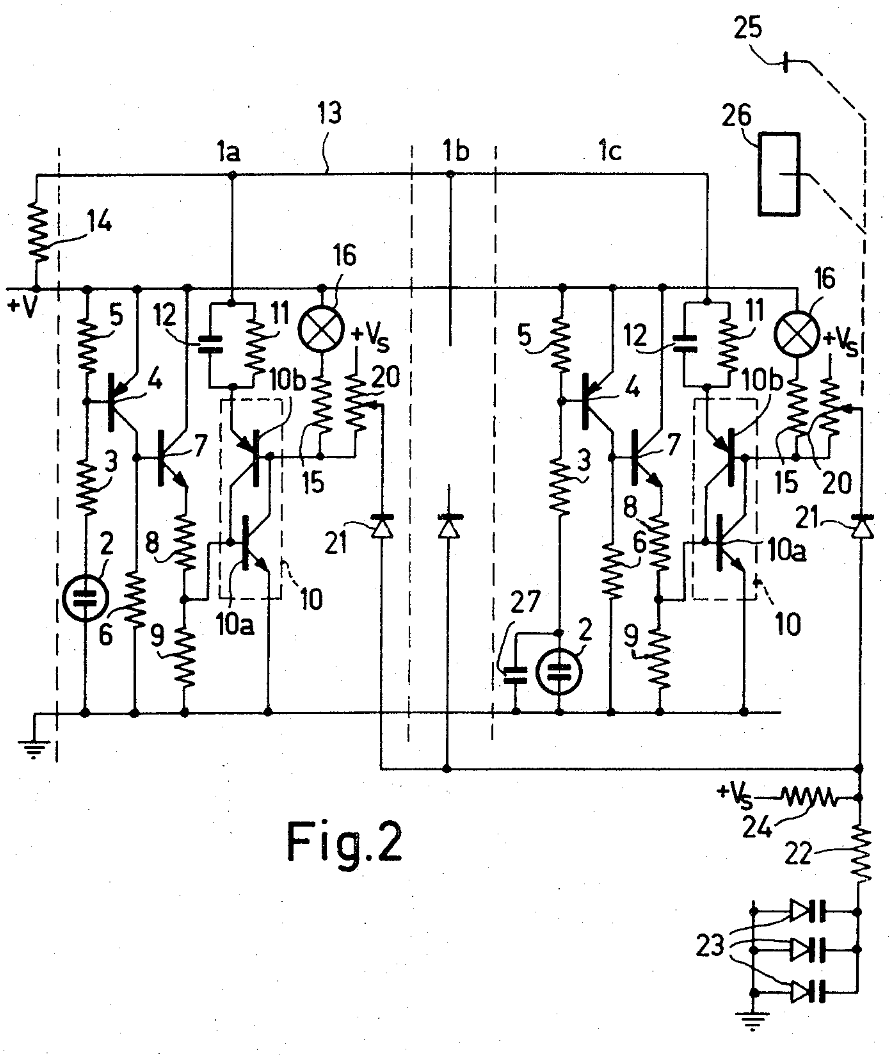

In order that the invention may be readily carried into effect some embodiments thereof will now be described in detail by way of example with reference to the accompanying diagrammatic drawings in which FIG. 1 shows a first embodiment without manual tuning of an arrangement according to the invention and FIG. 2 shows a second embodiment with manual tuning of an arrangement according to the invention.

FIG. 1 shows an arrangement according to the invention having a plurality of similar operating units 1*a*, 1*b* etc. of which only t1e unit 1*a* is shown in greater detail. Each operating unit comprises a signalling device 2 constituted by two fixed conductors which are isolated from each other and which can be finger-tip-operated by touching the two conductors simultaneously. As a result, a slightly conducting connection in the order of several M. Ohms is established between these conductors. The signalling device 2 is connected through a resistor 3 to the base electrode of a pnp-transistor 4 whose emitter electrode is connected to the positive terminal +V of a voltage supply source. A resistor 5 connects the base electrode of transistor 4 to this terminal.

A collector resistor 6 of high value (1 M. Ohm) as well as the base electrode of an emitter follower transistor 7 having two emitter resistors 8 and 9 are connected to the collector electrode of the transistor 4. The voltage at the junction between resistors 8 and 9 is applied to the base electrode of a four-layer pnpn semiconductor device 10 (for example, BRY 39) the emitter electrode of which is connected to ground while the anode is connected through the parallel arrangement of a resistor 11 and capacitor 12 to a lead 13 which is common to all operating units and which is connected to the positive terminal +V of the voltage supply source through a resistor 14 which is likewise common to all operating units.

A visual indicator, for example, a lamp 16 is connected through a resistor 15 between the collector electrode of the four-layer semiconductor device and the positive terminal +V, while furthermore the base electrode of a pnp transistor 18 is connected to this collector electrode through a resistor 17. The emitter electrode of this transistor as well as the base electrode via a resistor 19 are connected to the positive terminal +Vs of a satisfactorily stabilised direct voltage source. An adjustable potentiometer 20 is connected between the collector electrode of transistor 18 and ground (the negative terminal of the two voltage supply sources). The wipers on the potentiometers 20 of all operating units are each connected with respect to direct current through a blocking diode 21 and through a common resistor 22 to the cathodes of variable capacity diodes 23 which ensure the tuning of the receiver to be tuned. The connections with respect to alternating current of these variable capacity diodes in the tuning circuits of the receiver are not shown for convenience' sake.

As regards its operation the four-layer semiconductor device 10 may be assumed to be a combination of an npn transistor 10*a* and a pnp transistor 10*b* in which the base electrode of transistor 10*b* is connected to the collector electrode of transistor 10*a*, and the base electrode of transistor 10*a* is connected to the collector electrode of transistor 10*b*. The emitter, base and collector electrodes of the four-layer semiconductor device are constituted by the emitter, base and collector electrodes of transistor 10*a*, while the emitter electrode of transistor 10*b* constitutes the anode of the four-layer semiconductor device. It is to be noted that transistor 10*a* in the four-layer semiconductor device has a large current amplification, whereas transistor 10*b* has only a small current amplification.

As long as the signal generator 2 is not touched, transistor 4 does not carry any current, nor does the emitter follower transistor 7. If it is assumed that, for example, the operating unit 1*b* is operating and the other operating units are inoperative, the four-layer semiconductor device of the operating unit 1*a* is also without any current. The anode current of the four-layer semiconductor device of the operating unit 1*b* causes a voltage drop, for example, 10 V across resistor 14 (at a supply voltage of 15 V), so that the voltage of the lead 13 and hence the anode voltage of the four-layer semiconductor device 10 in the operating unit 1*a* is 5 volts relative to ground. On the other hand the collector voltage of the device 10 in the operating unit 1*a* is equal to +V (15 volts) so that a voltage difference of 10 Volt exists between base and emitter electrodes of transistor 10*b*, which difference maintains this transistor cut off with certainty. Since neither transistor 7 nor transistor **10*b* supply a base current for transistor 10*a*, this transistor neither conveys current. Then also the lamp 16 and transistor 18 of the operating unit 1*a* are inoperative and the wiper on potentiometer 20** is therefore at ground potential at any position of this wiper.

When the signalling device 2 in the operating unit **1*a* is touched, transistor 4 starts to conduct. Since the connection then established by the signalling device 2 is highly resistive, the current flowing through transistor 4 is only very low (for example, several tens of $\mu$A), but this current is sufficient to produce a relatively high voltage across the resistor 6 of high value. This voltage appears through emitter follower 7 at the base electrode of transistor 10*a*** and causes this transistor to conduct.

The conductance of transistor **10*a* causes a drop in the base voltage of transistor 10*b* down to below the 5 Volt emitter level. As a result transistor 10*b* also starts to conduct. The collector current of transistor 10*b* then maintains the transistor 10*a* conducting in its saturated state also when the signalling device 2 is subsequently released so that transistors 4 and 7** do not convey any current.

The conductance of transistor 10a results in the lamp 16 lighting up and in the transistor 18 starting to conduct into the saturated state. As a result, potentiometer 20 is arranged between ground and +Vs. The tuning voltage adjustable with the aid of the wiper on this potentiometer and present on this wiper is applied through diode 21 and resistor 22 to the variable capacity diodes 23. The blocking diodes 21 of the other operating units prevent this tuning voltage from being short-circuited via the potentiometers of these operating units.

The conductance of transistors **10*a* and 10*b* also results in the anode potential of the four-layer semiconductor device (the emitter potential of transistor 10*b*) decreasing to substantially ground potential. Since capacitor 12 of the operating unit 1*a* is initially uncharged, the potential of the lead 13 also decreases to ground potential. However, since capacitor 12 of the operating unit 1*b* is charged to 5 Volt, the emitter voltage of transistor 106 of the operating unit 1*b* decreases to below ground potential (approximately −5 volts). As a result transistor 10*b* of operating unit 1*b* and hence transistor 10*a*** of this unit is cut off with with certainty.

Capacitor 12 of unit **1*b* is subsequently discharged through the resistor 11 arranged in parallel therewith. Capacitor 12 of unit 1*a* is charged by the anode current of the device 10, so that the potential of the lead 13 increases again to +5 volts. When this charge is complete, this anode current entirely flows through resistor 11 and resistor 14**.

The locking arrangement constituted by resistor 14, lead 13 and resistors 11 and capacitors 12 in the various units therefore causes only one operating unit to be in the operating condition, namely the unit whose signalling device has been operated last.

It is to be noted that since all switching elements of all operating units in the rest condition do not convey current, a circuit arrangement of low current consumption is obtained. Since also transistors 4 and 1 of the operating unit in the operating condition normally do not convey current and furthermore the currents of transistors **10*b* and 18 of this unit may be low, the overall current consumption of the entire arrangement is substantially equal to that of the indicator 16** of the operating unit which is in the operating condition.

The resistor 15 serves to protect the four-layer semiconductor device in the case when a short circuit occurs in the indicator. Resistor 3 prevents the base-emitter current of transistor 4 from becoming too high when the conductors of the signalling device 2 are short-circuited. The emitter electrodes of transistors 4 may be connected in a manner not further shown, for example, with the aid of a potential divider to a voltage which is slightly lower than the supply voltage +V. The threshold voltage thus supplied to transistor 4 prevents this transistor from conducting when the signalling device 2 receives low interference voltages. The voltage +V may of course be derived from the stabilised supply +Vs, but then this stabilised supply must be able to supply the relatively large current of the indicator 16.

FIG. 2 shows a simplification of the circuit diagram of FIG. 1 in the sense that the resistor 18 with the associated resistors 17 and 19 have been omitted and that the adjustable potentiometer 20 is directly arranged between the collector electrode of the four-layer semiconductor device and +Vs. The switching function of transistor 18 of FIG. 1 is therefore taken over by transistor **10*a* of the four-layer semiconductor device. Since the potentiometers 20 of the operating units in the rest condition and hence the wipers on these potentiometers convey the voltage +Vs, the blocking diodes 21 are reversed in polarity relative to those of FIG. 1. In order to ensure that always some current flows in the pass direction through the blocking diode 21 of the operating unit that is in the operating condition, a resistor 24** is provided between the interconnected anodes of the blocking diodes and the +Vs terminal.

The operating unit **1*c* of FIG. 2 serves for tuning the receiver with the aid of a tuning knob 25 and a tuning dial 26. In this end the tuning knob 25 and the tuning dial 26 are mechanically coupled to the wiper on potentiometer 20 of the operating unit 1*c*. It is desired that when switching on the receiver, the operating unit 1c automatically comes in its operating condition, that is to say, without the operation of its signalling device 2. To this end a capacitor 27 is arranged parallel across the signalling device 2 of this operating unit. When the supply voltage +V is applied, both the emitter electrodes and the base electrodes of transistors 4 of the operating units 1*a*, 1*b* and possibly further units will convey this voltage. These transistors 4 therefore remain without current and the relevant operating units consequently remain in the rest condition. The base voltage of transistor 4 of the operating unit 1*c* remains, however, lower for some period than the voltage +V as a result of the capacitor 27** after switching on, so that this transistor starts to convey current immediately when the device is switched on and brings this operating unit in its operating condition.

What is claimed is:

1. A circuit for applying a tuning voltage to at least one voltage controlled reactance element, said circuit comprising a plurality of activatible circuits each comprising an operable signalling device; a bistable trigger circuit having an operating state and a substantially zero current rest state, said trigger circuit comprising a four layer semiconductor having an emitter electrode adapted to be coupled to a first terminal of a voltage supply, a base electrode coupled to said signalling device for setting said trigger circuit into said operating state upon operation of said signalling device, an anode electrode means for conducting current when said trigger circuit is in said operating state and substantially no current when in said rest state, and a collector electrode; adjustable potentiometer means adapted to be coupled across a second voltage supply and between said collector electrode and said element for providing said tuning voltage to said element upon activiation of said respective activatible circuit; and locking means for setting and keeping the remaining activatible circuits in said rest state when one of said trigger circuits is set into said operating state comprising a parallel circuit including and a resistor and a capacitor coupled to said anode, and a resistor common to all of said activatible circuits having one end coupled to said parallel circuit and a remaining end adapted to be coupled to the second terminal of said voltage supply source.

2. A circuit as claimed in claim 1 wherein said second voltage supply comprises a stabilized supply source.

3. A circuit as claimed in claim 1 wherein each of said potentiometers is directly connected across said respective collector and said second voltage supply.

4. A circuit as claimed in claim 1 wherein a potentiometer in one of said activatible circuits further comprises a wiper and said activatible circuit further comprising a capacitor parallel coupled to said respective signalling device, a tuning knob and a tuning dial mechanically coupled to each other and to said wiper.

* * * * *